US012456446B2

(12) United States Patent
Headley et al.

(10) Patent No.: US 12,456,446 B2
(45) Date of Patent: Oct. 28, 2025

(54) APPARATUS AND SYSTEM FOR DYNAMIC HIGH NRC ACOUSTIC LOCKING WALL TILE AND METHODS THEREOF

(71) Applicant: TURF DESIGN, INC., Gilberts, IL (US)

(72) Inventors: Dustin Headley, Hoffman Estates, IL (US); Michael Egan, CHicago, IL (US)

(73) Assignee: TURF DESIGN, INC., Gilberts, IL (US)

( * ) Notice: Subject to any disclaimer, the term of this patent is extended or adjusted under 35 U.S.C. 154(b) by 280 days.

(21) Appl. No.: 17/589,808

(22) Filed: Jan. 31, 2022

(65) Prior Publication Data

US 2022/0246126 A1 Aug. 4, 2022

Related U.S. Application Data

(60) Provisional application No. 63/143,254, filed on Jan. 29, 2021.

(51) Int. Cl.

| | |
|---|---|
| ***G10K 11/162*** | (2006.01) |
| ***E04B 1/32*** | (2006.01) |
| ***E04B 1/84*** | (2006.01) |
| ***E04B 1/99*** | (2006.01) |
| ***E04B 9/00*** | (2006.01) |
| ***E04B 9/04*** | (2006.01) |
| ***E04B 9/24*** | (2006.01) |
| ***E04F 13/08*** | (2006.01) |

(52) U.S. Cl.

CPC .............. *G10K 11/162* (2013.01); *E04B 1/99* (2013.01); *E04B 9/001* (2013.01); *E04B 9/0414* (2013.01); *E04B 9/0457* (2013.01); *E04B 9/247* (2013.01); *E04B 9/248* (2013.01); *E04F 13/0835* (2013.01); *E04F 13/0867* (2013.01); *E04F 13/0883* (2013.01); *E04B 2001/3294* (2013.01); *E04B 2001/8471* (2013.01)

(58) Field of Classification Search

CPC ..... G10K 11/162; E04B 9/001; E04B 9/0457; E04B 9/247; E04B 1/99; E04B 9/0414; E04B 2001/3294; E04B 2001/8471; E04B 9/248; E04F 13/0883; E04F 13/0867; E04F 13/0835

See application file for complete search history.

(56) References Cited

U.S. PATENT DOCUMENTS

| | | | | |
|---|---|---|---|---|
| 2,882,990 A * | 4/1959 | Mustoe | G10K 11/16 493/379 |
| 4,672,780 A * | 6/1987 | Lockwood | E04C 2/326 52/630 |
| 4,776,139 A * | 10/1988 | Lockwood | E04C 2/326 52/630 |
| 8,782,987 B2 | 7/2014 | Kabatsi | |
| 10,508,444 B2 | 12/2019 | Gillette et al. | |

(Continued)

*Primary Examiner* — Andrew J Triggs

(74) *Attorney, Agent, or Firm* — Patrick Sheldrake

(57) ABSTRACT

A locking dynamic high NRC acoustic baffle and/or tile and a locking dynamic high NRC ceiling and/or wall system, that includes a single piece of material folded into locking dynamic high NRC acoustic baffles and/or tiles, using locking pieces and locking mechanisms, to quickly and easily install the locking dynamic high NRC acoustic baffle and/or tile onto construction ceiling hangers or onto walls to provide an aesthetically pleasing image, along with a reduction in unwanted noise or room acoustics.

18 Claims, 11 Drawing Sheets

(56) References Cited

U.S. PATENT DOCUMENTS

| | | | | |
|---|---|---|---|---|
| 10,662,647 | B2 * | 5/2020 | Kilian | E04B 9/225 |
| 10,961,700 | B2 | 3/2021 | Udagawa et al. | |
| 11,105,101 | B2 * | 8/2021 | Stary | E04C 2/38 |
| 11,603,661 | B2 * | 3/2023 | Gillette | E04B 9/045 |
| 2005/0011150 | A1 | 1/2005 | Stackenwalt | |
| 2015/0121772 | A1 * | 5/2015 | Berken | E04B 2/7405 52/28 |
| 2021/0054620 | A1 | 2/2021 | Headley | |
| 2022/0246126 | A1 * | 8/2022 | Headley | E04B 1/99 |

* cited by examiner

ISOMETRIC

ISOMETRIC W/ GHOSTED ASSEMBLY

REAR ELEVATION

ISOMETRIC [REAR]

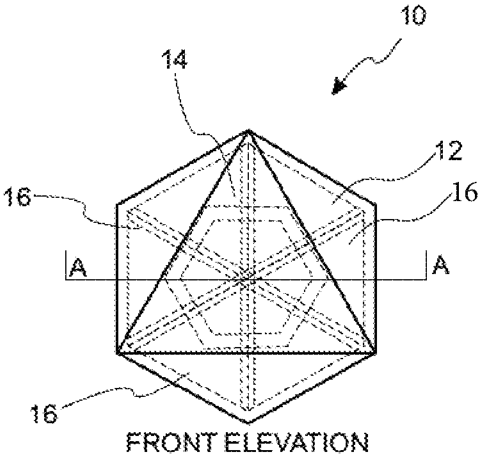
FIG. 3A
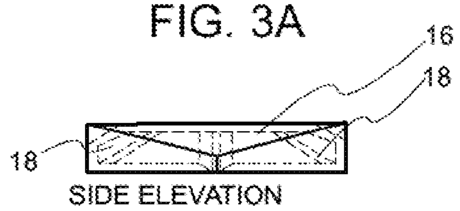
FIG. 3B
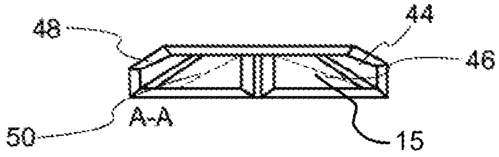
FIG. 3C
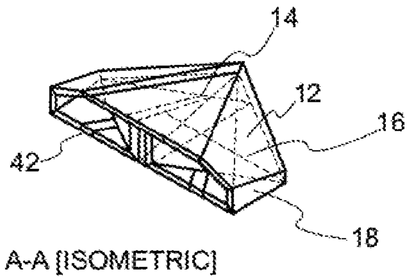
FIG. 3D
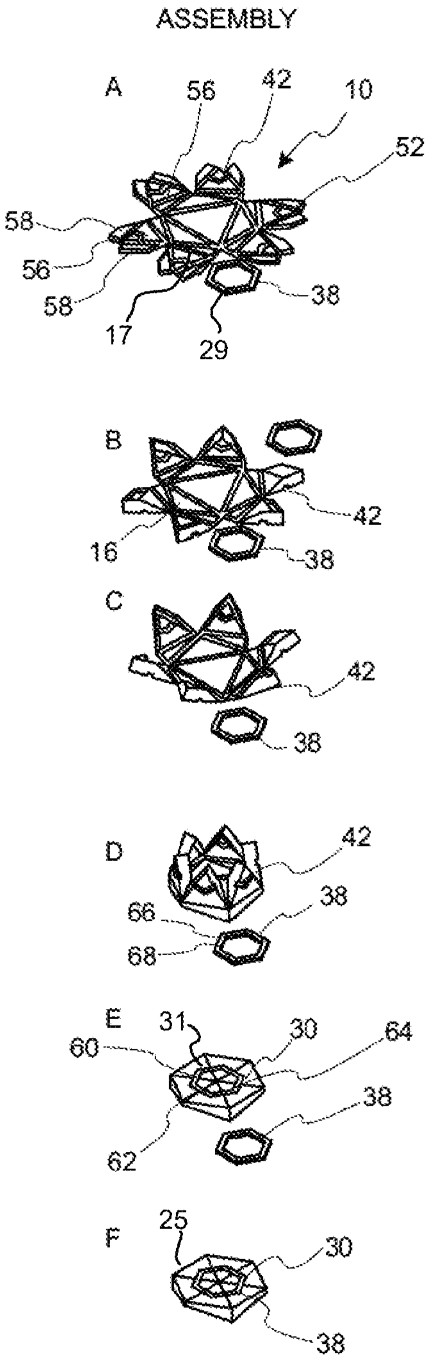
FIG. 4 A-F

| 1/3 Octave Band Center Frequency (Hz) | Total Absorption (Sabins) | Absorption Coefficient |
|---|---|---|
| 31.5 | -0.50 | -0.01 |
| 40 | 1.71 | 0.02 |
| 50 | 5.60 | 0.08 |
| 63 | -1.10 | -0.01 |
| 80 | 10.79 | 0.15 |
| 100 | 12.17 | 0.16 |
| 125 | 10.82 | 0.15 |
| 160 | 13.87 | 0.19 |
| 200 | 24.73 | 0.33 |
| 250 | 31.73 | 0.43 |
| 315 | 46.39 | 0.63 |
| 400 | 56.72 | 0.77 |
| 500 | 69.96 | 0.95 |
| 630 | 76.91 | 1.04 |
| 800 | 79.31 | 1.07 |
| 1000 | 79.97 | 1.08 |
| 1250 | 79.45 | 1.08 |
| 1600 | 81.37 | 1.10 |
| 2000 | 79.60 | 1.08 |
| 2500 | 76.21 | 1.03 |
| 3150 | 76.12 | 1.03 |
| 4000 | 78.35 | 1.06 |
| 5000 | 77.55 | 1.05 |
| 6300 | 74.84 | 1.01 |
| 8000 | 67.22 | 0.91 |
| 10000 | 60.36 | 0.82 |
| 12500 | 42.62 | 0.58 |

84 85 86 87

SAA = 0.88 88
NRC = 0.90 90

APPARATUS AND SYSTEM FOR DYNAMIC HIGH NRC ACOUSTIC LOCKING WALL TILE AND METHODS THEREOF

CROSS-REFERENCE TO RELATED APPLICATIONS

This application claims priority to U.S. Provisional Patent Application No. 63/143,254, filed Jan. 29, 2021, entitled APPARATUS AND SYSTEM FOR DYNAMIC HIGH NRC ACOUSTIC LOCKING CEILING AND WALL SYSTEM AND METHODS THEREOF, which is hereby incorporated by reference in its entirety as though fully set forth herein.

FIELD OF THE INVENTION a. Technical Field

The instant disclosure relates to dynamic high noise reduction coefficient acoustic locking ceiling and/or wall baffles and tiles, a system for dynamic high noise reduction coefficient acoustic locking ceiling and/or wall baffles and tiles, along with the methods for installing the dynamic high noise reduction coefficient locking ceiling and/or wall baffles and tiles. Noise reduction coefficient may be referred to herein as NRC, and in particular, the instant disclosure relates to a dynamic high NRC coefficient acoustic ceiling and/or wall system that utilizes a locking mechanism for configuring each dynamic high NRC baffle and/or tile from a flat surface configuration into a resulting, folded or final dynamic high NRC acoustic locking ceiling and/or wall baffle and tile configuration. The resulting, folded or final dynamic high NRC acoustic locking ceiling and/or wall baffle and tile configuration will contain multiple sections or air gaps within the apparatus, thereby greatly reducing unwanted noise. The final locking dynamic high NRC acoustic baffle and tile configuration can be quickly and easily installed into construction ceiling hangers or attached to wall or wall systems, using integrated locking mechanisms, adhesive, cables or magnets, or any other devices to provide an aesthetically pleasing image, along with a high reduction in unwanted noise and/or room acoustics.

The instant disclosure further relates to an apparatus that is configured using recycled polyester felt or PET Felt, and in an embodiment, is made up of a two-dimensional configuration that can be bent and/or folded into a dynamic high NRC acoustic baffle and/or tile shape, which utilizes a locking piece or locking instrument to lock or retain the dynamic high NRC acoustic baffle and/or tile shape. Each locking dynamic high NRC acoustic baffle and/or tile is configured from a PET Felt sheet with pre-formed folding scores and cutouts that will either receive the locking instruments once the dynamic high NRC acoustic baffle and/or tile has been created, or folded into the resultant shape. Additionally, the locking piece may comprise magnets attached or integrated into the dynamic high NRC acoustic baffle and/or tile thereby obviating the need for a locking instrument.

The dynamic high NRC acoustic baffle and/or tile may also be configured to allow for a locking mechanism or configuration, possibly made of the same PET Felt material, either through cutouts or by addition of material, but can also be made from adhesive, cables or magnets. The locking mechanism, as opposed to the locking piece, is used for installing the locking dynamic high NRC acoustic baffle into a ceiling hanger without any extra tools, clips or attachment devices.

Throughout the present disclosure, the dynamic high NRC acoustic ceiling and/or wall baffle and/or tile may be described merely as a ceiling baffle. It should be understood by one having ordinary skill in the art that the ceiling baffle description herein applies to both ceiling and/or wall baffles and/or tiles, and the reference herein should not be limiting, but is merely disclosed as such for ease of understanding.

b. Background of Disclosure

In general terms, ceilings can be of two different types, suspended or exposed. Suspended ceilings are usually hung at a distance below the structural members to hide mechanical and electrical equipment, along with electrical conduit, HVAC ducts, water pipes, sewage lines, lighting fixtures, and similar structures. In order to construct a suspended ceiling, a metal grid is suspended from the actual ceiling, usually by wires, and acoustical or similar tiles, are inserted and supported by the grid.

However, either for cost or design purposes, many designs provide that the mechanical and electrical equipment are to be seen and not hidden. In these designs, there is no dropped ceiling and the ceiling is left to be viewed from the floor. Although the exposed ceiling may be a function of the design appeal, quite often an exposed ceiling creates acoustic problems, especially in large industrial rooms. Sounds from one area of the room, can be reflected off the ceiling and be heard in other areas of the room. If there are a lot of workers or machinery, the room can become quite loud.

Additionally, room walls can be a source of noise as sound can likewise be reflected off of wall structures and depending on the wall configurations or locations, can be amplified or combined with other sound waves to create an unwanted noise that bounces around the room and can interfere with conversations or quiet zones.

In order to minimize excessive and/or unwanted sound generated because of the exposed ceiling, one solution is to hang baffles from the ceiling at certain intervals to allow for the exposed ceiling to be viewed, but to reduce the acoustic profile. As an example of a structure intended to reduce unwanted noise is the Supported Architectural Structure disclosed and claimed in U.S. Pat. No. 8,782,987, to Kabatsi et al., which discloses a plurality of primary supports configured to couple with one or more architectural structures, and a plurality of flexible fins is incorporated into the structure using primary supports, secondary supports and attachment points.

Another example of a ceiling structure is U.S. patent application Ser. No. 10/774,233, to Stackenwalt et al., which discloses a decorative structure, which may be curved, suspended within a space and which includes a panel fastened to a support structure by a clip, a portion of which extends along a face of the panel.

Additionally, wall coverings or structures can be implemented in an attempt to reduce unwanted room noise. As an example of a wall structure intended to reduce unwanted noise is the Noise Reduction Apparatus And Method Of Making And Using The Same in U.S. Pat. No. 10,961,700, to Udagawa et al., which discloses a noise reduction apparatus that can include a frame and multiple spaced apart panels positioned adjacent to each other. Each of the panels or only one of the spaced apart panel elements may have holes therein to receive acoustic waves for absorbing the waves between the panels. The panels can be attached to a frame or other connection structure so that the arrangement of panels can be hung over a work space or positioned in a work space (e.g. in a wall, formed as a partition or wall, included as part of shelving, etc.). The panels can also be incorporated into a light fixture that may hang from a ceiling or be attached to some other type of support (e.g. a table, a base, etc.). The panels can be composed of glass, wood, or other of material.

These examples utilize additional supports, attachment hardware and clips to assist in suspending the flexible fins or decorative panels to the wall, ceiling, wall structure or ceiling structure. Additionally, these systems, wall tiles and ceiling baffles do not provide the high level of noise reduction that a high NRC wall tile, ceiling baffle or high NRC system would provide. In doing so, each of these examples necessitate tools to assemble the structure and to suspend the structure to the ceiling or ceiling support structure.

As such there is a need for a locking dynamic high NRC acoustic wall tile and/or ceiling baffle system that includes high NRC baffles and/or wall tiles, that look solid, but are hollow with multiple sections or air gaps, and that can be quickly and easily assembled or folded from a flat piece of material containing scoring and or cuttings. There is also a need for high NRC wall tiles or ceiling baffles that are sized and configured to be placed next to or near each other on a wall or ceiling to optimize the reduction of unwanted room noise. There is also a need for a locking dynamic high NRC acoustic wall and/or ceiling system that includes high NRC wall tiles and/or ceiling baffles, that can be easily installed onto existing walls and/or construction ceiling hangers or support structures, with or without the need for tools, separate attachment devices, clips or the like. This dynamic high NRC acoustic wall tile or ceiling baffle system must be aesthetically pleasing, and greatly reduce unwanted noise or room acoustics.

The foregoing is intended only to illustrate the present technical field and background art and should not be taken as a limitation or disavowal of claim scope.

BRIEF SUMMARY

The present disclosure is an improved locking dynamic high NRC acoustic wall tile and/or ceiling baffle, and an improved dynamic acoustic locking wall tile and/or ceiling baffle system, along with improved methods for assembling and installing the locking dynamic high NRC acoustic tiles and/or baffles to create the dynamic acoustic locking wall tile and/or ceiling baffle system. The improvement comprises a single piece of flat material, pre-scored, cut and configured with or without an integral locking mechanism, to be folded or assembled into a shape that can provide multiple air gaps. The shape may be tessellated shape, wedge, square, rectangular, semi-circular or a triangular shape, among others. The locking mechanism can be cut out of the same single piece of material and be attached to a standard ceiling and/or wall structure, can incorporate adhesives, magnets, either or both embedded or integrated into the single piece of material. The locking mechanism can also be a cable connector and associated cables attached, embedded or integrated into the single piece of material, among other locking mechanisms.

The dynamic high NRC acoustic tile and/or baffle (hereinafter referred to as tile or baffle) is held in its folded configuration using a locking piece, which can be separate or integral with the single piece of material used to manufacture the tile, but not necessarily. The locking piece which holds the tile together, is different from the locking mechanism, which allows the tile to be attached to a wall or ceiling. The locking piece can be made from a similar material such as felt. Additionally, the locking piece may comprise magnets or a hook and loop attachment to lock or hold the locking dynamic high NRC acoustic tile or baffle together. The locking dynamic high NRC acoustic tile or baffle can then be quickly and easily assembled or folded and installed onto or into ceiling hangers or ceiling structures, such as a standard UNISTRUT® metal framing system, to provide an aesthetically pleasing image, along with functioning to greatly reduce unwanted noise or room acoustics.

The present disclosure comprises a dynamic high NRC acoustic tile or baffle that is manufactured from a recyclable and/or recycled material, such as recycled polyester felt or PET Felt, and in an embodiment, provides that each dynamic high NRC acoustic tile or baffle is configured from a single piece of the PET Felt and folded into a tessellated shape, in the preferred embodiment, or into a dynamic high NRC acoustic tile or baffle with one or more locking pieces, such as a felt locking piece, magnets, or hook and loop devices, which hold or lock the tessellated, triangular or other shape (as described herein) in place. In this preferred embodiment, the piece of PET Felt is configured to be folded from a flat material piece such that the locking mechanism, which is different from the locking piece, can be exposed and used to install the dynamic high NRC acoustic tile or baffle into the ceiling hangers.

The dynamic high NRC acoustic tile or baffle is configured to look like it is a solid piece of PET Felt, but instead the dynamic high NRC acoustic tile or baffle has one or more air gaps created when the dynamic high NRC acoustic tile or baffle shape is folded or configured into the final or resulting form or configuration. Once formed, the rear end of the dynamic high NRC acoustic tile or baffle (the part to be connected to the wall or ceiling hanger and not seen from the floor) comprises one or more locking configurations or mechanisms made of the same PET Felt material. This locking mechanism allows for the dynamic high NRC acoustic tile or baffle to be attached to a ceiling hanger for example without the need for tools, clips or any additional attachment devices (besides the locking mechanism).

The present disclosure further relates to an improved dynamic high NRC acoustic locking ceiling system comprising a number of shaped locking dynamic high NRC acoustic tiles or baffle, such as tessellated, triangular or wedge shaped, that can be installed onto a wall or into a ceiling structure such that the system, as a whole, provides an aesthetically pleasing image.

The present disclosure further relates to an improved method of installing the locking dynamic high NRC acoustic tiles or baffles and creating the dynamic acoustic locking ceiling system, in which the acoustic locking dynamic high NRC acoustic tiles or baffles are installed onto the wall or into the ceiling structure by pushing the locking mechanism into the existing wall or ceiling hanger, such as the standard UNISTRUT® metal framing system, without the need for additional tools, clips or additional attachment devices, to provide an aesthetically pleasing image, and to function to greatly reduce unwanted noise or room acoustics.

The present disclosure also relates to an improved method of installing the locking dynamic high NRC acoustic tiles or baffles and creating the dynamic acoustic locking ceiling system, in which the locking dynamic high NRC acoustic tiles or baffles are snapped or attached to the wall or ceiling structure through the use of adhesives, such that once constructed, the dynamic high NRC acoustic tile or baffle can be affixed to the existing wall or ceiling hanger, such as the standard UNISTRUT® metal framing system, using adhesives and without the need for additional tools, clips or additional attachment devices, to provide an aesthetically pleasing image, and to function to greatly reduce unwanted noise or room acoustics.

The present disclosure also relates to an improved method of installing the locking dynamic high NRC acoustic tiles or baffles and creating the dynamic acoustic locking ceiling system, in which the locking dynamic high NRC acoustic tiles or baffles are snapped or attached to the wall or ceiling structure through the use of magnets and magnetic attraction, such that magnets strategically embedded in the dynamic high NRC acoustic tile or baffle in a location that once constructed, the dynamic high NRC acoustic tile or baffle can be affixed to the existing wall (using a metal backing) or ceiling hanger (such as the standard UNISTRUT® metal framing system), using the magnets and without the need for additional tools, clips or additional attachment devices, to provide an aesthetically pleasing image, and to function to greatly reduce unwanted noise or room acoustics.

The present disclosure also relates to an improved method of installing the locking dynamic high NRC acoustic tiles or baffles and creating the dynamic acoustic locking ceiling system, in which the locking dynamic high NRC acoustic tiles or baffles are attached to the ceiling structure through the use of cables and cable connectors, such that connectors strategically embedded or attached to the dynamic high NRC acoustic tile or baffle in a location that once constructed, the dynamic high NRC acoustic tile or baffle can be affixed to the existing ceiling hanger, such as the standard UNISTRUT® metal framing system, using the cable connectors and cables, without the need for additional tools, clips or additional attachment devices, to provide an aesthetically pleasing image, and to function to greatly reduce unwanted noise or room acoustics.

It is thus an objective of the present disclosure to provide an improved locking dynamic high NRC acoustic tile or baffle, comprising a single piece of folded material and one or more locking pieces, along with a configuration in the folded material that creates a locking mechanism made of the same material as the dynamic high NRC acoustic tile or baffle, and which allows for the dynamic high NRC acoustic tile or baffle to be installed into an existing wall or a ceiling hanger without the need for tools, clips or additional attachment devices.

It is yet another objective of the present disclosure to provide an improved locking dynamic high NRC acoustic tile or baffle, comprising a single piece of folded material and a plurality of embedded magnets to hold the dynamic high NRC acoustic tile or baffle together, along with adhesives to create a locking mechanism, which allow for the dynamic high NRC acoustic tile or baffle to be installed onto an existing wall or a ceiling hanger without the need for tools, clips or additional attachment devices.

It is yet another objective of the present disclosure to provide an improved locking dynamic high NRC acoustic tile or baffle, comprising a single piece of folded material and a plurality of embedded magnets to hold the dynamic high NRC acoustic tile or baffle together, along with additional magnets located to create a locking mechanism made of the embedded magnets, and which allow for the dynamic high NRC acoustic tile or baffle to be installed onto a wall or an existing ceiling hanger without the need for tools, clips or additional attachment devices.

It is yet another objective of the present disclosure to provide an improved locking dynamic high NRC acoustic tile or baffle, comprising a single piece of folded material with one or more locking pieces to hold the dynamic high NRC acoustic tile or baffle together, along with additional cable connectors and cables to create a locking mechanism, and which allow for the dynamic high NRC acoustic tile or baffle to be installed onto an existing ceiling hanger without the need for tools, clips or additional attachment devices.

It is yet another object of the present disclosure to provide an improved dynamic high NRC locking wall or ceiling system in which the improved locking dynamic high NRC acoustic tiles or baffles are installed in a manner and pattern that creates an aesthetically pleasing image and functions to greatly reduce unwanted noise or room acoustics.

It is yet another objective of the present disclosure to provide an improved method for installing the improved locking dynamic high NRC acoustic tiles or baffles and thereby creating the dynamic high NRC acoustic locking wall or ceiling system with an aesthetically pleasing image and which functions to greatly reduce unwanted noise or room acoustics.

Additional objectives and advantages of the present disclosure will become apparent to one having ordinary skill in the art after reading the specification in light of the drawing figures, however, the spirit and scope of the present invention should not be limited to the description of the embodiments contained herein.

BRIEF DESCRIPTION OF THE DRAWINGS

FIG. 3A is a front elevation view of a locking dynamic high NRC acoustic tile or baffle with ghosted assembly in accordance with the present disclosure.

FIG. 3B is a side elevation view of a locking dynamic high NRC acoustic tile or baffle with ghosted assembly in accordance with the present disclosure.

FIG. 3C is a side cutaway view AA from FIG. 2A of a locking dynamic high NRC acoustic tile or baffle with ghosted assembly in accordance with the present disclosure.

FIG. 3D is an isometric cutaway view AA from FIG. 2A of a locking dynamic high NRC acoustic tile or baffle with ghosted assembly in accordance with the present disclosure.

FIG. 4A is a perspective view of a locking dynamic high NRC acoustic tile or baffle with a locking piece prior to folding into a dynamic high NRC acoustic tile or baffle shape in accordance with the present disclosure.

FIG. 4B is a perspective view of a locking dynamic high NRC acoustic tile or baffle with a locking piece during folding into a dynamic high NRC acoustic tile or baffle shape in accordance with the present disclosure.

FIG. 4C is a perspective view of a locking dynamic high NRC acoustic tile or baffle with a locking piece during folding into a dynamic high NRC acoustic tile or baffle shape in accordance with the present disclosure.

FIG. 4D is a perspective view of a locking dynamic high NRC acoustic tile or baffle with a locking piece during folding into a dynamic high NRC acoustic tile or baffle shape in accordance with the present disclosure.

FIG. 4E is a perspective view of a locking dynamic high NRC acoustic tile or baffle with a locking piece after folding into a dynamic high NRC acoustic tile or baffle shape in accordance with the present disclosure.

FIG. 4F is a perspective view of a locking dynamic high NRC acoustic tile or baffle after folding into a dynamic high NRC acoustic tile or baffle shape and installing a locking piece in accordance with the present disclosure.

DETAILED DESCRIPTION

Figure 1A:
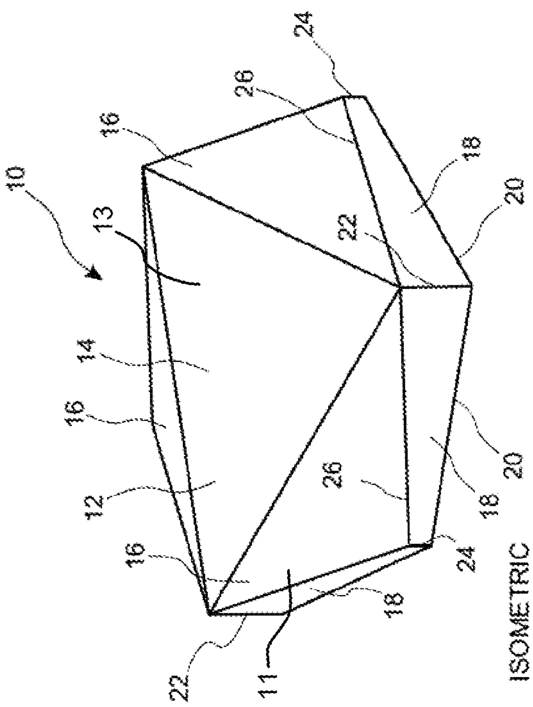
FIG. 1A is an isometric view of a locking dynamic high NRC acoustic tile or baffle in accordance with the present disclosure.

As stated herein, the objective of the present disclosure is to provide an improved locking dynamic high NRC acoustic tile or baffle, and an improved dynamic high NRC acoustic locking wall or ceiling system, along with improved methods for installing the locking dynamic high NRC acoustic tiles or baffles and creating the dynamic high NRC acoustic locking ceiling and/or wall system.

Referring to the drawings, wherein like reference numerals refer to the same or similar features in the various views, FIGS. 1 through 4 show different views of a preferred embodiment of the improved locking dynamic high NRC acoustic tile or baffle and/or tile 10. FIGS. 1A and 1B show the resulting dynamic high NRC acoustic tile or baffle 10 from the front view, after being folded into the final or resulting shape. The high NRC acoustic performance is due to the multiple air gaps or sections created when the locking dynamic high NRC acoustic tile or baffle 10 is folded or assembled into its final form. In the preferred embodiment, the final form comprises six individual sections. More or less can be created by using alternative embodiments and designs.

The present disclosure further relates to a program used to create the dynamic high NRC acoustic tile or baffle 10 design by determining where the cuts and kerfs, as described herein, are to be located for the particular or specialized design. The system uses the program that determines or calculates the size of the dynamic high NRC acoustic tile or baffle 10, the size and location of the walls, top and bottom portions, and the location of the kerfs in the walls. The kerf placement will determine the location that the tile or baffle 10 will bend or flex to create the resulting device 10 and related air gap sizes for the device 10. These design and manufacturing processes and methods are described in detail in US Patent Publication No. 20210054620, which is incorporated in its entirety by reference herein.

Figure 1B:
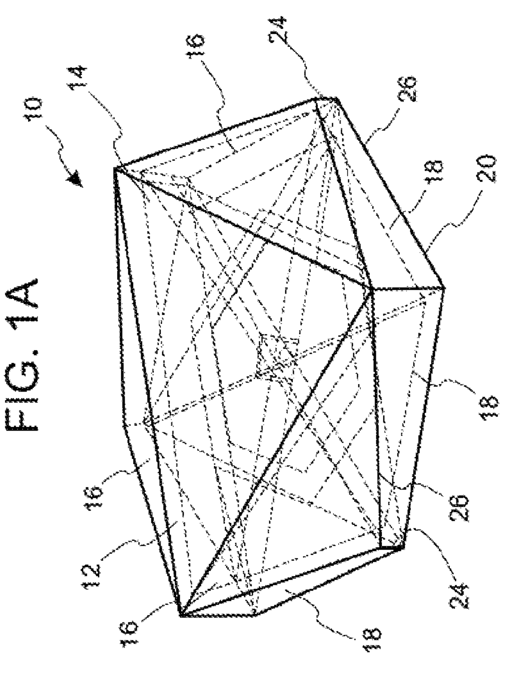
FIG. 1B is an isometric view of a locking dynamic high NRC acoustic tile or baffle with ghosted assembly in accordance with the present disclosure.

Accordingly, FIG. 1A is an isometric view of the dynamic high NRC acoustic tile or baffle 10 from the front side 12 of the baffle, and FIG. 1B shows the dynamic high NRC acoustic tile or baffle 10 in an isometric elevation with a ghosted assembly.

As shown in FIGS. 1A and 1B, the preferred embodiment comprises a design that, from the front, shows a plurality of outer surfaces 11 comprising an equilateral triangle 14 in the front middle, three identical isosceles triangles 16, on each edge of the equilateral triangle 14, and six parallelograms 18. Each parallelogram 18 being the same size, and comprising a first side 20 parallel to the equilateral triangle 14 (and flat across the bottom side of the baffle 10), a first edge 22 approximately 2.5 inches high, a second edge 24 approximately 2.0 inches high, and the second side 26 running on an angle from the top of the first edge 22 to the top of the second edge 24. These shapes, one equilateral triangle 14, three isosceles triangles 16, and six parallelograms 18, make up the ten sides of the front elevation 12 of the dynamic high NRC acoustic tile or baffle 10. In some embodiments, the dynamic high NRC acoustic tile or baffle 10 is formed in a three-dimensional configuration such as a faceted dome 13. In such embodiments, the equilateral triangle 14, the isosceles triangles 16, and the parallelograms 18 collectively form the faceted dome 13.

Figure 2A:
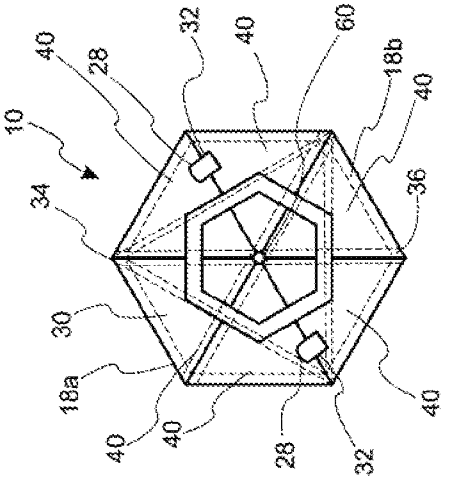
FIG. 2A is a rear elevation view of a locking dynamic high NRC acoustic tile or baffle with a locking piece in accordance with the present disclosure.
Figure 2B:
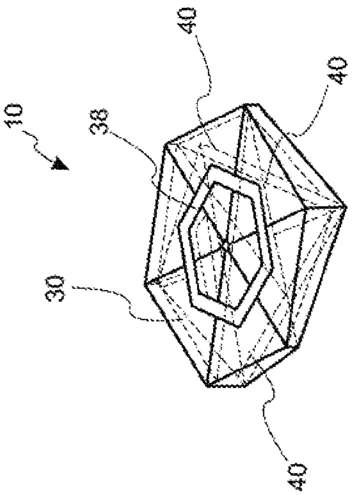
FIG. 2B is an isometric rear elevation view of a locking dynamic high NRC acoustic tile or baffle with a locking piece in accordance with the present disclosure.

FIGS. 2A and 2B show the rear elevation and rear isometric view, respectively, of the resulting dynamic high NRC acoustic tile or baffle 10 after being folded into shape. The locking mechanism 28 of the dynamic high NRC acoustic tile or baffle 10 is located on the rear or back side 30, and can be attached or integrated into the dynamic high NRC acoustic tile or baffle 10. For example, a magnet 32 can be integrated or attached to the rear side 30, or a cable connector and cable can be attached (not shown), or the locking mechanism 28 can be cut directly into the dynamic high NRC acoustic tile or baffle 10, using a double arrow or other design (not shown).

The dynamic high NRC acoustic tile or baffle 10, which in the preferred embodiment, is made from a single sheet of 9 mm polyester felt or PET Felt, and is intended to be folded into a tessellated shape, approximately 11.7 inches from opposite parallelograms 18*a*, 18*b*, and approximately 13.5 inches from corner 34 to opposite corner 36. Other shapes and sizes are contemplated in this disclosure and the present disclosure is not limited to the size and shapes described herein.

The dynamic high NRC acoustic tile or baffle 10 is held in its final shape or configuration, after being folded, by using one or more locking pieces 38. In the preferred embodiment, one locking piece 38 is used to hold the dynamic high NRC acoustic tile or baffle 10 in its final shape or configuration. The dynamic high NRC acoustic tile or baffle 10 is cut and/or scored such that once folded into its final configuration, the locking piece 38 can be inserted into the scored portion to hold the baffle 10 in the final configuration, as detailed below.

In particular, the rear or back side 30 is the side that faces away from the view from the front when looking up or at the dynamic high NRC acoustic tile or baffle 10 after it has been installed. Once folded into the final dynamic high NRC acoustic tile or baffle 10 shape, as shown in FIG. 2A, there will be six equilateral triangular portions 40. Each of the six equilateral triangular portions 40 will be scored such that when the dynamic high NRC acoustic tile or baffle 10 is folded the scoring on each of the six equilateral triangular portions 40 will combine to create an indent or depression 42 on the back side, such that the locking piece 38 can be inserted into the depression 42 to hold the equilateral triangular portions 40, and thus the dynamic high NRC acoustic tile or baffle 10, in its final shape.

FIGS. 3A through 3D show additional views of the dynamic high NRC acoustic tile or baffle 10 after being folded or assembled into the final shape or configuration. FIG. 3A shows a front elevation of the dynamic high NRC acoustic tile or baffle 10 with a ghosted assembly in dashed lines. FIG. 3B shows a side elevation of the dynamic high NRC acoustic tile or baffle 10 with the ghosted assembly in dashed lines. FIG. 3C shows a cutaway view from FIG. 3A in the middle of the dynamic high NRC acoustic tile or baffle 10 at AA, with the ghosted assembly in dashed lines. FIG. 3C also illustrates an enclosed internal volume 15 of the acoustic tile. FIG. 3D shows an isometric cutaway view of the dynamic high NRC acoustic tile or baffle 10 at AA, with the ghosted assembly in dashed lines.

As will be seen below, the dynamic high NRC acoustic tile or baffle 10 creates multiple air gaps 44, 46, 48, 50 within the baffle 10, as shown in FIG. 3C, for example. In the present configuration, the final folded baffle 10 will contain six air gaps, corresponding to the six triangular portions 40. Other configurations will contain more or less air gaps. These air gaps create the high NRC for the baffle 10.

FIGS. 4A through 4F show the dynamic high NRC acoustic tile or baffle 10 being assembled or folded from a flat, precisely cut or scored piece of material 52 to the final dynamic high NRC acoustic tile or baffle 10 with the locking piece 38 inserted. FIG. 4A shows the dynamic high NRC acoustic tile or baffle 10 prior to being constructed into its resulting shape. The unfolded or flat 52 dynamic high NRC acoustic tile or baffle 10 is made from a single piece of material 52, pre-scored for easy folding, and has various cutouts, as described herein, for the shape of the dynamic high NRC acoustic tile or baffle 10 and for other functions, such as the depression or indent 62 for the locking piece 38, and the locking mechanism 28, to the extent it is part of the configuration.

In the preferred embodiment shown in FIG. 4A, the flat piece of material 52 has been cut into two separate pieces, the first piece 54 that will be folded to create the actual baffle 10, and the locking piece 38. In some embodiments, the locking structure 38 may comprise an annular structure 29 that engages an annular depression 31 in the baffle 10. The first piece 54 is cut such that there are six extensions 56, two symmetrical extensions on each side of one of the isosceles triangles 16, which are connected (by a score mark) to the equilateral triangle 14. Each extension comprises inner surfaces 17 that at least partially define one of the air gaps 44, 46, 48, and 50 and an additional score mark. The inner surfaces 17 of each extension comprise the enclosed internal volume 15 of the baffle 10. Each extension is further scored with two ears 58 opposite each other on the side of each extension 56. Finally, a portion of the indent or depression 42 is cut into the extensions 56 on the other side from the scoring.

FIG. 4B shows the beginning of the folding process, in which the two ears 58 on each extension 56 are folded inward using the pre-score to assist in the proper folding. Once each of the ears 58 are folded inward, FIG. 4C shows that each extension 56 is then folded inward at the side of the isosceles triangle 16. Once all of the extensions 56 have been folded inwards at the isosceles triangle 16, FIG. 4D shows each of the extensions 56 being folded at the second side 26 of the parallelogram 18. This action allows each extension to fold into the center 60, and create the six triangular portions 40, as shown in FIG. 4E. Now the depression 42 in each of the six triangular portions 40 have created a full six sided depression 62. The six sided locking piece 38 can now be inserted into the six sided depression 62 to hold the folded dynamic high NRC acoustic tile or baffle 10 in place in the three-dimensional configuration, as shown in FIG. 4F. FIG. 4F is the back side 30 of the dynamic high NRC acoustic tile or baffle 10, as also shown in FIG. 2B. In some embodiments, an outer perimetric edge 25 of the back side 30 forms a closed polygonal shape. The closed polygon shape may be a hexagon, but it is not limited to one specific shape.

As disclosed below, there are numerous dynamic high NRC acoustic tile or baffle shapes and configurations that can be constructed in accordance with the present disclosure. Further, the back side 30 of the dynamic high NRC acoustic tile or baffle 10 is where the locking mechanism 28 will be located. Accordingly, when the flat material 52 is folded at the side score lines as described above, the locking mechanism 28 will be accessible for locking the dynamic high NRC acoustic tile or baffle 10 onto the ceiling.

As set forth herein, the locking mechanism can be created by cutting it out of the same single piece of material 52 to be attached to the standard ceiling structure, such as a double arrow shape or a similar configuration. Additionally, the locking mechanism can be a magnet 32 attached, embedded or integrated into the single piece of material 52 in a location that will allow the baffle 10 to be attached to the ceiling structure. Additionally, the locking mechanism can be adhesives, or a cable connector attached, embedded or integrated into the single piece of material 52, among other locking mechanisms.

Further, since the extensions 56 and ears 58 are folded at the score lines during assembly or folding of the dynamic high NRC acoustic tile or baffle 10, this allows the dynamic high NRC acoustic tile or baffle 10 to be transported flat (FIG. 4A) and easily built or assembled at the installation site. This functionality reduces shipping costs and the chance for the dynamic high NRC acoustic tile or baffle 10 to be damaged during shipping.

FIGS. 2A and 2B show the locking piece 38, different than the locking mechanism 28, which is one example used to hold the dynamic high NRC acoustic tile or baffle 10 together. The locking piece 38 in the preferred embodiment is also made of PET Felt and is sized and shaped to be inserted into the dynamic high NRC acoustic tile or baffle 10 at the six sided depression 62, once folded to hold the dynamic high NRC acoustic tile or baffle 10 in its tessellated shape. The locking piece or pieces 38 can be inserted into the six sided depression 62 in the back side 30 of the dynamic high NRC acoustic tile or baffle 10 at the location 64 as shown in FIG. 2E.

In the preferred embodiment, each side of the locking piece 38 is 13.5 inches at the longest distance 66 and tapers down to the shortest distance 68 of 11.7 inches, although many other sizes can be used in keeping within the scope of the disclosure.

Figure 5:
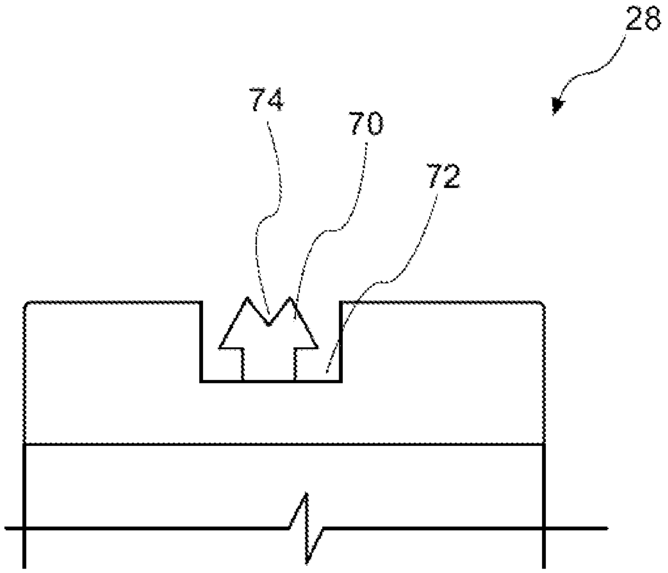
FIG. 5 is a front view of a locking mechanism of a dynamic high NRC acoustic tile or baffle in accordance with the present disclosure.

The resulting shape of the locking mechanism 28 on the dynamic high NRC acoustic tile or baffle 10 is shown in detail in FIG. 5, and is created by cutting away portions of the dynamic high NRC acoustic tile or baffle 10. The locking mechanism is sized to fit into the recessed portion of a ceiling hanger (FIG. 6), such as a standard UNISTRUT® metal framing system, without the need for additional tools, clips or additional attachment devices. The locking mechanisms, including the integrated locking mechanism, magnets and cables, among others, described herein and the installation methods relating thereto are described in detail in U.S. Pat. No. 10,508,444, which is incorporated in its entirety by reference herein.

The locking mechanism 28 is design is a double arrow 70, with recesses 72 below the double arrow 70 and an arrow recess 74 between the double arrows 70. The locking mechanism 28 is particularly designed or configured to mate with a ceiling hanger 76, as described herein. However, other locking mechanisms 28 can be designed and configured (using the dynamic high NRC acoustic tile or baffle material or other material) to mate with the same ceiling hanger 76 described herein, or to mate with other ceiling hangers, without departing from the spirit and scope of the invention. Additionally, the wall tiles 10 and wall tile systems 100 described herein can be attached or assembled onto various walls or wall structures using these and other methods. Accordingly, other ways of attaching the wall tiles and ceiling baffles 10 to wall and ceiling structures are understood by those having ordinary skill in the art.

As a non-limiting example, adhesives can be used to adhere the dynamic high NRC acoustic tile or baffle 10 to any wall or ceiling structure. Additionally, cable connector systems 92 can be embedded into the dynamic high NRC acoustic tile or baffle 10 and used to attach the dynamic high NRC acoustic tile or baffle 10 to any wall or ceiling structure using a cable length 96, as described herein. Additionally, a magnet system 102 can be used such that magnets 104 can be embedded into the dynamic high NRC acoustic tile or baffle 10 and used to attach the dynamic high NRC acoustic tile or baffle 10 to any wall or ceiling structure using a magnet 104, as described herein.

The locking mechanism 28 is created by cutting away the PET Felt to leave the double arrow 70 shape with the cutaway portion 74 between the double arrows 70 to allow for ease of insertion into the ceiling hanger 76 in accordance with the present disclosure. Due to the location of the locking mechanism 28 on the dynamic high NRC acoustic tile or baffle 10, the locking mechanism 28 is also 9 mm thick and is sized to fit into the recessed portion 78 of a standard ceiling hanger 76, such as a standard UNISTRUT® metal framing system, without the need for additional tools, clips or additional attachment devices. One or more locking mechanisms 28 can be designed into each dynamic high NRC acoustic tile or baffle 10 depending on the length and need of the dynamic high NRC acoustic tile or baffle 10.

Figure 6:
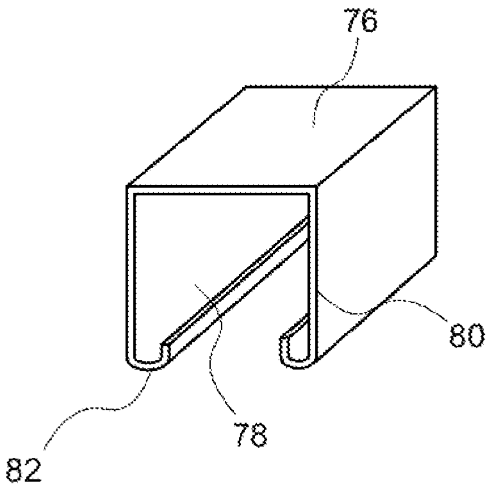
FIG. 6 is a perspective view of a prior art standard ceiling hanger in accordance with the present disclosure.

FIG. 6 shows a standard UNISTRUT® metal framing system, including the recessed portion 78, the sides of the ceiling hanger 80, and the J-shaped ends 82. To install the locking mechanism 28 of the dynamic high NRC acoustic tile or baffle 10 into the UNISTRUT ceiling hanger 76, the dynamic high NRC acoustic tile or baffle 10 is located such that the double arrows 70 can be slid into the recessed portion 78 of the ceiling hanger 76 to be held in place by the sides 80 of the ceiling hanger 76 and the J-shaped ends 82 on the sides 80. Additionally, the dynamic high NRC acoustic tile or baffle 10 can be placed in the proper location and pushed or snapped into place such that the double arrows 70 compress towards the arrow recess 74 and/or toward the recesses below the double arrows 70 to fit past the J-shaped ends 82 on the sides 80 of the ceiling hanger 76. Once past the J-shaped ends 82, the double arrows 70 spring back or expand back to their normal position inside ceiling hanger 76.

Different sized and shaped locking pieces 38 (for holding the dynamic high NRC acoustic tile or baffle 10 in its folded position) and locking mechanisms 28 (for installing the folded dynamic high NRC acoustic tile or baffle 10 onto the wall or into the ceiling hangers 40) can be created depending on need, based on the size and shape of the dynamic high NRC acoustic tile or baffle 10 and the ceiling hangers, or on any other device for which the dynamic high NRC acoustic tile or baffle 10 will be attached. Further, each dynamic high NRC acoustic tile or baffle 10 can be configured with more or less locking pieces 38 or locking mechanisms 28, then the preferred embodiment described herein, depending on the need, and based on the configuration of the dynamic high NRC acoustic tile or baffle 10 and the location and number of the ceiling hangers on the ceiling or other attachment devices on the wall or ceiling structure.

As described herein, the material used in the preferred embodiment is polyester felt and is 99% recycled. The dynamic high NRC acoustic tiles or baffles 10 in the preferred embodiment are 9 mm thick. The edge options are exposed felt, and maintenance includes occasional vacuuming to remove particulate matter and air-borne debris or dust. Compressed air can be used to dust off the material in difficult to reach areas and for large assemblies.

The felt comes in numerous colors, including white, cream, light grey, light brown, brown, matte grey, charcoal, black, yellow, mango, orange, red, lavender, lime, green, light blue and dark blue. Of course, the dynamic high NRC acoustic tiles or baffles 10 can be manufactured in many other colors and the present disclosure is not limited to these specifications and colors, as these are merely the specifications and colors for the preferred embodiments and alternative embodiments.

Figures 7, 8:
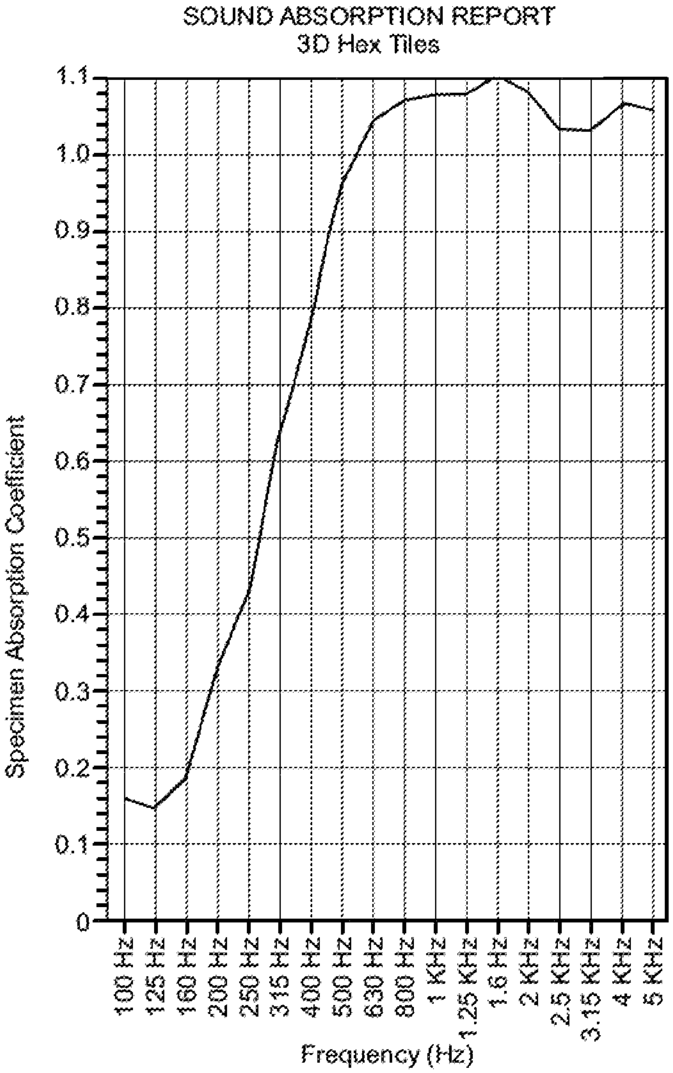
FIG. 7 is a chart of the acoustic testing in accordance with ASTM C 423-17 of the dynamic high NRC acoustic tiles or baffles in accordance with the present disclosure.
FIG. 8 is a graph of the acoustic testing in accordance with ASTM C 423-17 of the dynamic high NRC acoustic tiles or baffles in accordance with the present disclosure.

FIG. 7 shows a chart for the acoustic testing standard ASTM C423-17 for the dynamic high NRC acoustic tiles or baffles 10 in the preferred embodiment. The chart indicates testing on the preferred embodiment and provides the results of the sound absorption coefficient for the dynamic high NRC acoustic tile or baffle 10 at various frequencies. The test arrangement used a +100 mm air layer filled with 50 mm rock wool board. As described herein, the noise reduction coefficient at 500 Hz 84 is 0.95 85, and at 1000 Hz 86 is 1.08 87. Further, the dynamic high NRC acoustic tiles or baffles 10 are fire rated as UL tested ASTM E-84: Class A.

FIG. 8 shows the graph of the sound absorption coefficient against frequency for the same test as charted in FIG. 7, with the sound absorption average (SAA) of 0.88 88, and the noise reduction coefficient (NRC) of 0.90 90.

Figure 9A:
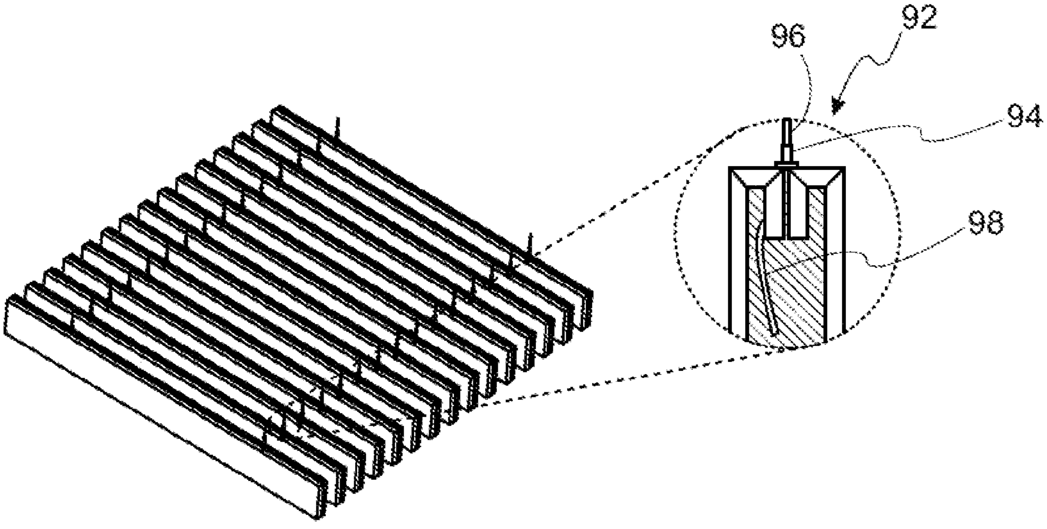
FIGS. 9A and 9B are perspective views of an attachment mechanism of a dynamic high NRC acoustic tile or baffle in accordance with an alternative embodiment of the present disclosure.
Figure 9B:
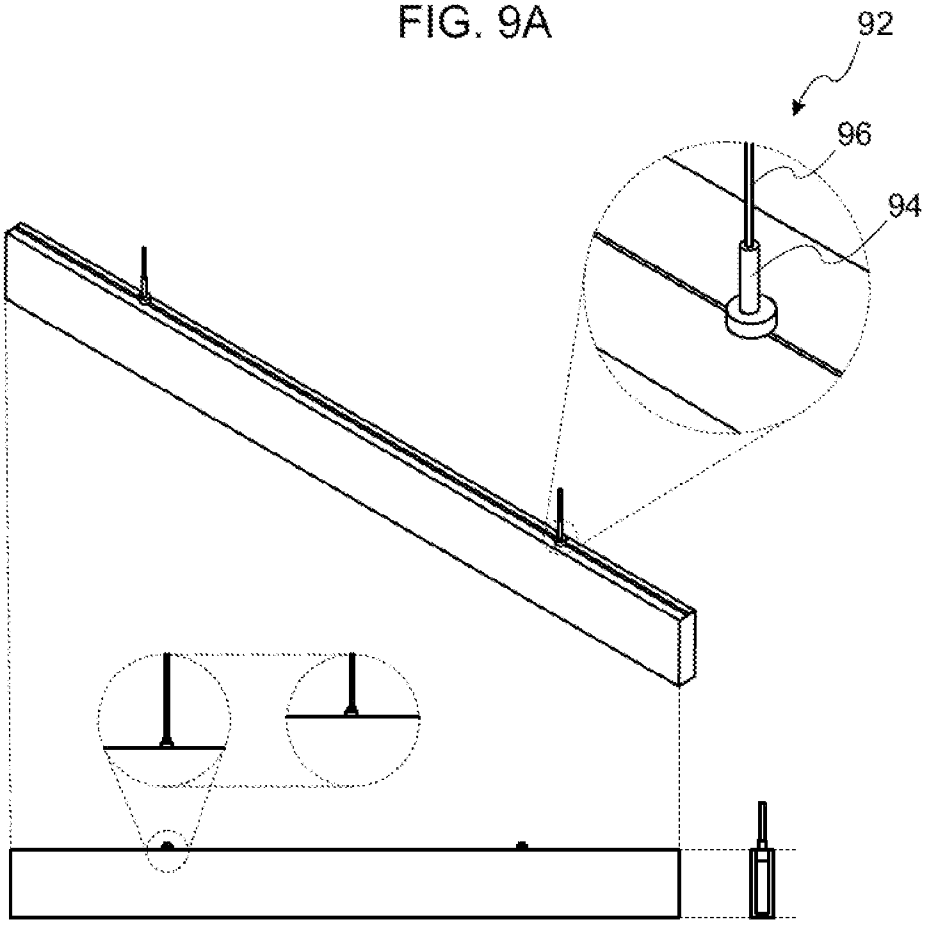

Alternative embodiments exist for attaching a dynamic high NRC acoustic tile or baffle 10 to a ceiling. One alternative embodiment is shown in FIGS. 9A and 9B and utilizes a cable suspension system 92 in which the dynamic high NRC acoustic tiles or baffles 10 have an embedded cable gripper 94 such that the dynamic high NRC acoustic tile or baffle 10 can be snapped into deck-mounted aircraft cables 96. The aircraft cables 96 can be arranged in any desired pattern or configuration and once installed, the excess cable 98 will protrude through the dynamic high NRC acoustic tile or baffle 10 and can be cut off with a scissors or left alone.

Figure 10A:
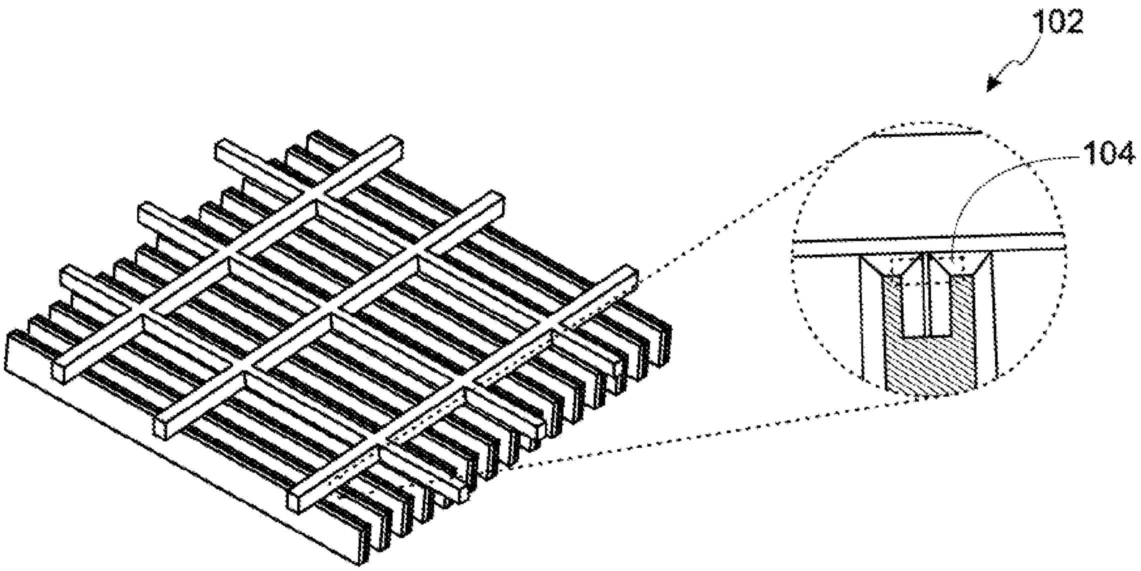
FIGS. 10A and 10B are perspective views of a locking mechanism of a dynamic high NRC acoustic tile or baffle in accordance with an alternative embodiment of the present disclosure.
Figure 10B:
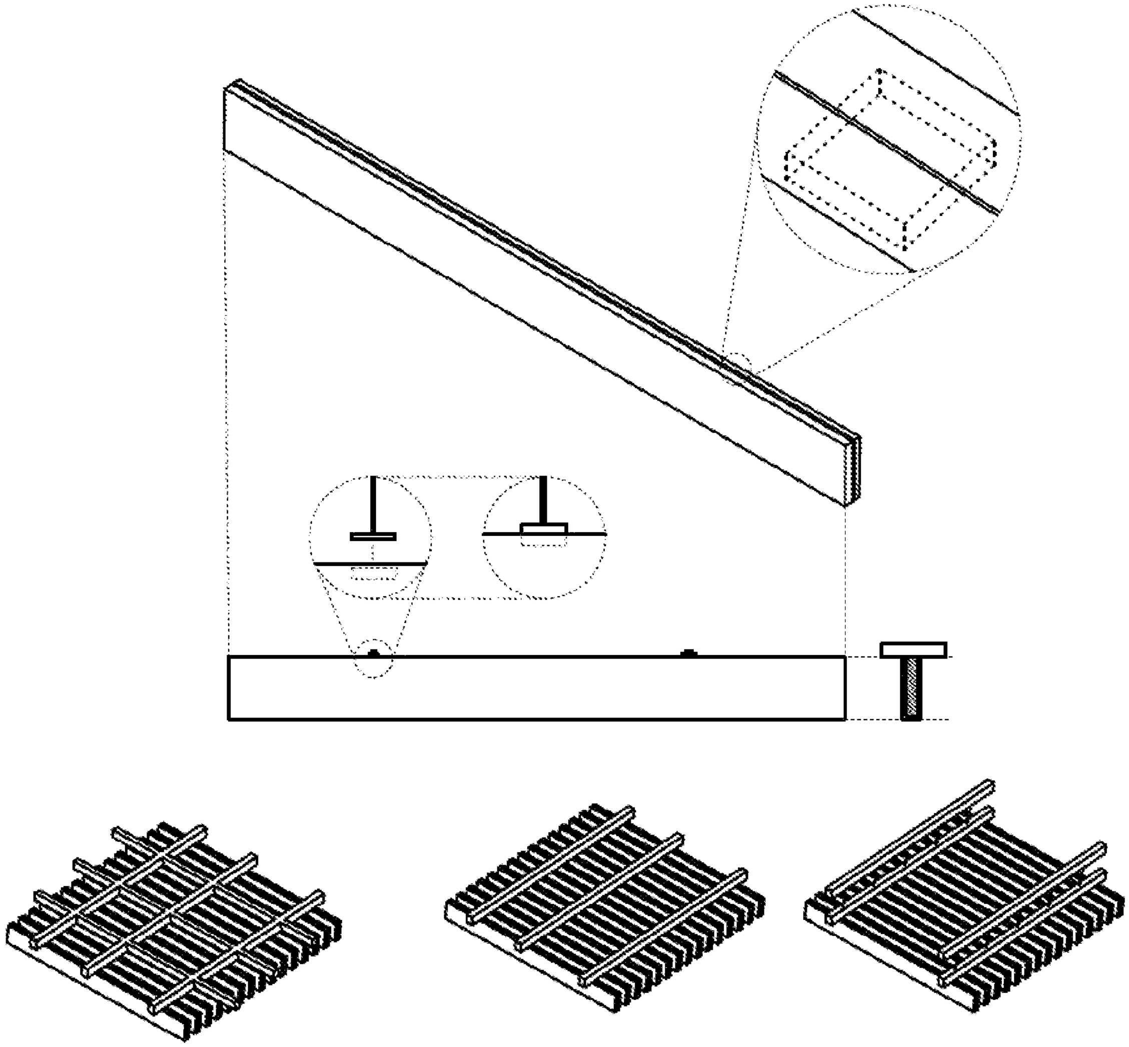

As detailed above, an embodiment for attaching a dynamic high NRC acoustic tile or baffle 10 to a ceiling is shown in FIGS. 10A and 10B and utilizes a magnetic connection system 102. The dynamic high NRC acoustic tiles or baffles 10 are embedded with one or more magnets 104 such that they will connect and hang onto any wall, ceiling or associated structure that is made from any ferrous metal material, such as a metallic wall, Unistrut, tee bar or steel joist, among others. The dynamic high NRC acoustic tile or baffle 10 containing the magnet(s) 104 can be snapped into place adjacent the ferrous metal structure in any desired pattern or configuration.

Additionally as disclosed above, an alternative embodiment for assembling the dynamic high NRC acoustic tile or baffle 10 of the present disclosure includes using magnets 106 embedded into the dynamic high NRC acoustic tile or baffle 10 so that when the flat dynamic high NRC acoustic tile or baffle 10 is folded and assembled into its final form, the embedded magnets 106 will hold the dynamic high NRC acoustic tile or baffle 10 in that form without the need for the locking piece 38 disclosed herein.

The flat dynamic high NRC acoustic tile or baffle 10 with one or more magnets 106 embedded into or attached onto the dynamic high NRC acoustic tile or baffle 10 on one side, and with one or more magnets 106 embedded into the dynamic high NRC acoustic tile or baffle 10 on the other side, so that when the dynamic high NRC acoustic tile or baffle 10 is folded or assembled into its final form, the magnets 106 will come in close contact or actually make contact with each other, thereby holding the assembled dynamic high NRC acoustic tile or baffle 10 together. These magnets 106 are different than the magnets 104 used for the locking mechanism 28 disclosed herein, although, in certain designs the same magnets can be used for both purposes.

Figure 11:
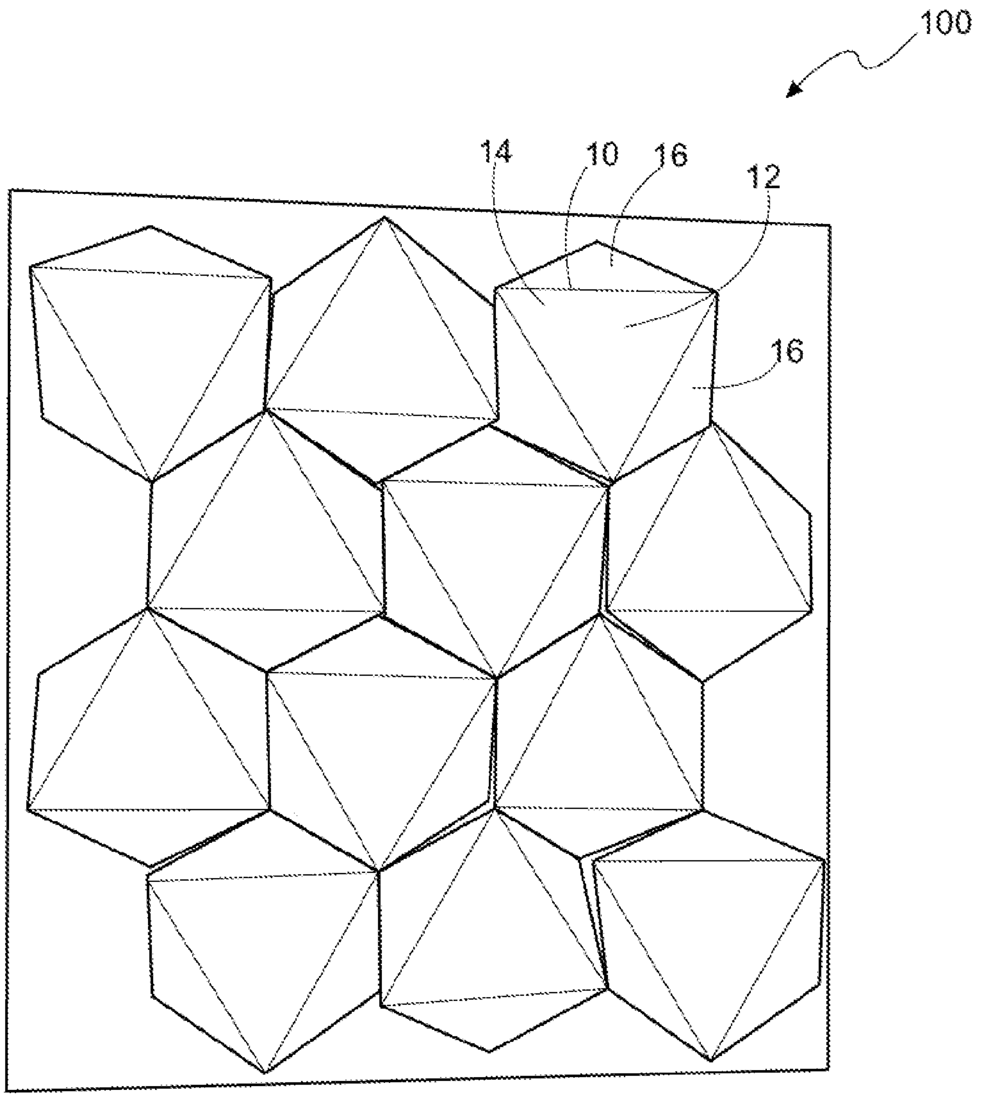
FIG. 11 is a perspective view of a dynamic high NRC acoustic system in accordance with the present disclosure.

FIG. 11 shows the dynamic high NRC acoustic tiles or baffles 10 folded or assembled and included with other dynamic high NRC acoustic tiles or baffles 10 to create a dynamic high NRC acoustic tile or baffle system 100. The embodiment shown in FIG. 11, attaches each dynamic high NRC acoustic tile or baffle 10 to the wall or ceiling structure utilizing an adhesive connection system (or one of the other locking mechanisms or attachment systems described herein). The dynamic high NRC acoustic tiles or baffles 10 are adhered such that they will connect and hang onto any wall, ceiling or associated structure.

As understood by one having ordinary skill in the art, many other arrangements of the dynamic high NRC acoustic tiles or baffles 10 can be designed to create numerous dynamic high NRC acoustic tile or baffle systems 100. The dynamic high NRC acoustic tiles or baffles 10 are attached to the wall or ceiling to create the dynamic high NRC acoustic tiles or baffle systems 100 using one or more of the numerous locking mechanisms described herein.

Figure 12A:
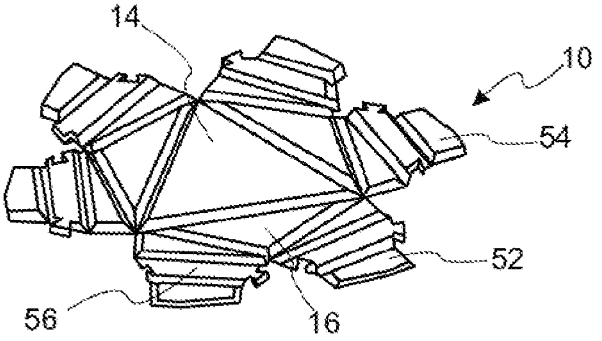
FIG. 12A is a perspective view of a locking dynamic high NRC acoustic tile or baffle with a locking piece prior to folding into a dynamic high NRC acoustic tile or baffle shape in accordance with the present disclosure.
Figure 12B:
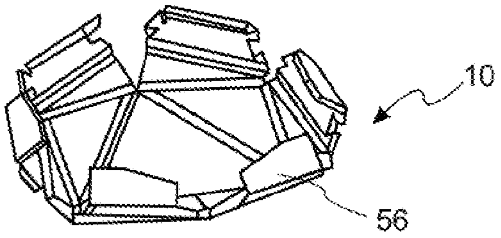
FIG. 12B is a perspective view of a locking dynamic high NRC acoustic tile or baffle with a locking piece during folding into a dynamic high NRC acoustic tile or baffle shape in accordance with the present disclosure.
Figure 12C:
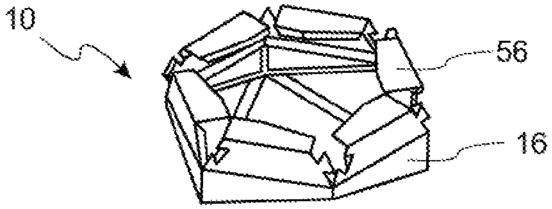
FIG. 12C is a perspective view of a locking dynamic high NRC acoustic tile or baffle with a locking piece during folding into a dynamic high NRC acoustic tile or baffle shape in accordance with the present disclosure.
Figure 12D:
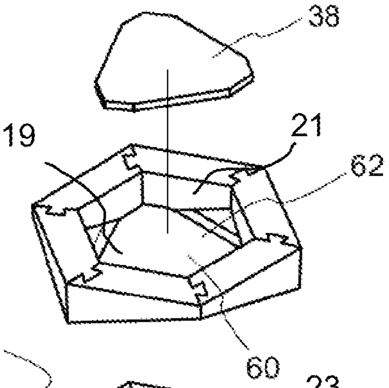
FIG. 12D is a perspective view of a locking dynamic high NRC acoustic tile or baffle with a locking piece during folding into a dynamic high NRC acoustic tile or baffle shape in accordance with the present disclosure.
Figure 12E:
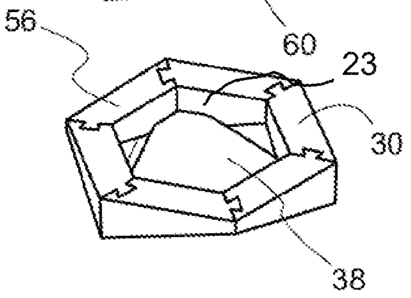
FIG. 12E is a perspective view of a locking dynamic high NRC acoustic tile or baffle with a locking piece after folding into a dynamic high NRC acoustic tile or baffle shape in accordance with the present disclosure.

Similar to FIGS. 4A through 4F, FIGS. 12A through 12F show an alternative embodiment of the dynamic high NRC acoustic tile or baffle 10 being assembled or folded from a flat, precisely cut or scored piece of material 52 to the final dynamic high NRC acoustic tile or baffle 10 with the locking piece 38 inserted (see FIG. 12E).

FIG. 12A shows the dynamic high NRC acoustic tile or baffle 10 prior to being constructed into its resulting shape. The unfolded or flat 52 dynamic high NRC acoustic tile or baffle 10 is made from a single piece of material 52, pre-scored for easy folding, and has various cutouts, as described herein, for the shape of the dynamic high NRC acoustic tile or baffle 10 and for other functions, such as the depression 62 configured for the locking piece 38, and the locking mechanism 28, to the extent it is part of the configuration.

In the alternative embodiment shown in FIG. 12A, the flat piece of material 52 has been cut into two separate pieces, the first piece 54 that will be folded to create the actual baffle 10, and the locking piece 38 (shown in FIG. 12D). The first piece 54 is cut such that there are six extensions 56 on each side of one of the isosceles triangles 16, which are connected (by a score mark) to the equilateral triangle 14. Each extension comprises additional score marks and cuts such that the six extensions can be folded into the resulting shapes shown in FIGS. 12D and 12 E.

FIG. 12B shows the beginning of the folding process, in which the extensions 56 are folded inward using the pre-scores to assist in the proper folding. Once each of the extensions are folded inward, FIG. 12C shows that each extension 56 is continued to be folded inward at the side of the isosceles triangle 16.

Once all of the extensions 56 have been folded inwards at the isosceles triangle 16, FIG. 12D shows each of the extensions 56 comprising a cutout male dovetail and female dovetail for inserting and receiving the dovetail cutouts from the adjacent extension 56. This allows the extensions to properly and securely fit next to each other and hold the extensions 56 together in their resulting position. This action also allows each extension to fold like a puzzle piece towards the center 60, and create the six portions 40, as shown in FIG. 12E.

Figure 12F:
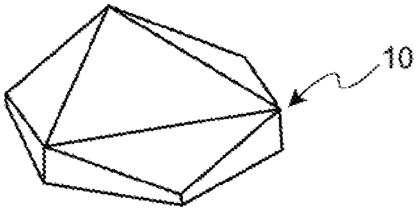
FIG. 12F is a perspective view of a locking dynamic high NRC acoustic tile or baffle after folding into a dynamic high NRC acoustic tile or baffle shape and installing a locking piece in accordance with the present disclosure.

The folded configuration of each of the six extensions 56 has now created a depression or tile or baffle recess 62 in the underside of the tile or baffle 10. The locking piece 38 is properly sized and configured to be inserted into the depression 62 to hold the six extensions 56 and thus the folded dynamic high NRC acoustic tile or baffle 10 in place, as shown in FIG. 12F.

In this alternative embodiment, the locking piece 38 is generally equilateral triangular shaped, with each of the (usually three 60 degree) corners of the equilateral triangle instead made up of two sides. These two sides (six in all) are equal in length and are configured to press or butt up against the fully folded extensions 56 to lock the extensions 56 in place and hold the tile or baffle 10 together.

FIG. 12E is the back side 30 of the alternative embodiment of a dynamic high NRC acoustic tile or baffle 10, wherein the locking piece 38 is holding the extensions 56 together and in place. The back side 30 comprises a central recess 19. Each of the extensions 56 further comprise a surface that defines a portion of the back side 30 and a sidewall 21. The sidewalls 21 of the plurality of extensions 56 collectively form an annular wall 23 that defines the central recess 19. FIG. 12F shows the front side of the folded and resulting dynamic high NRC acoustic tile or baffle 10.

Figure 13A:
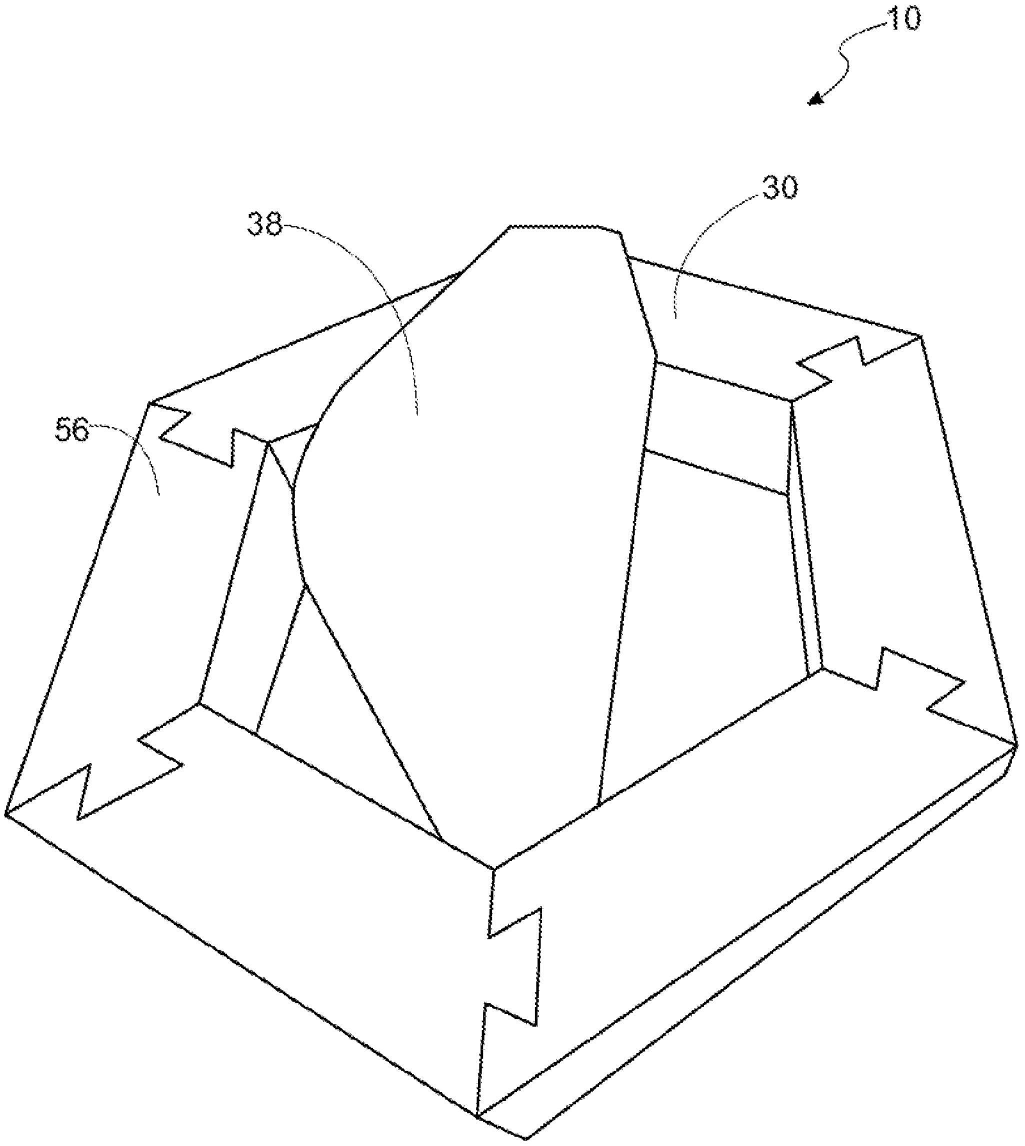
FIG. 13A is a perspective top view of an alternative embodiment of a locking dynamic high NRC acoustic tile or baffle in accordance with the present disclosure.

Similar to FIG. 12E, FIG. 13A shows the back side 30 of the alternative embodiment of a dynamic high NRC acoustic tile or baffle 10, as the locking piece 38 is being inserted into the proper location for holding the extensions 56 together and in place.

Figure 13B:
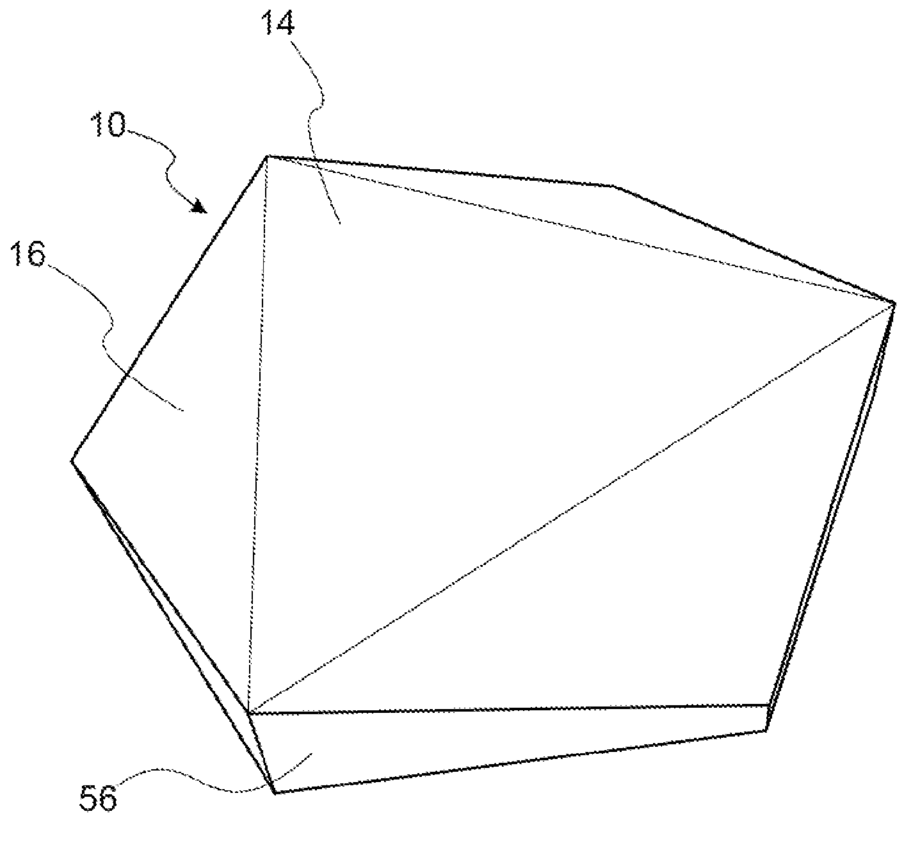
FIG. 13B is a perspective bottom view of an alternative embodiment of a locking dynamic high NRC acoustic tile or baffle with ghosted assembly in accordance with the present disclosure.

Similar to FIG. 12F, FIG. 13B shows the front side view of the alternative embodiment of a dynamic high NRC acoustic tile or baffle 10, prior to being installed onto a wall or ceiling for creating a dynamic high NRC acoustic tile or baffle system 100.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment," or "in an embodiment", or the like, in places throughout the specification are not necessarily all referring to the same embodiment.

Further, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional. Although numerous embodiments of this invention have been described above with a certain degree of particularity, those skilled in the art could make numerous alterations to the disclosed embodiments without departing from the spirit or scope of this disclosure.

All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the any aspect of the disclosure.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. An acoustic tile comprising:

a single piece of material folded along a plurality of folding scores to form a three-dimensional configuration, the three-dimensional configuration comprising a plurality of folded extensions and a plurality of outer surfaces arranged in a non-coplanar and non-orthogonal orientation relative to one another to collectively form a faceted dome; and a locking piece holding the single piece of material in the three-dimensional configuration;

wherein inner surfaces of the folded extensions at least partially define at least one air gap having an enclosed internal volume within the three-dimensional configuration wherein the locking piece interacts with each of the of the folded extensions to hold the single piece of material in the three-dimensional configuration.

2. The acoustic tile according to claim 1 wherein the locking piece comprises an annular structure.

3. The acoustic tile according to claim 2 further comprising:

the three-dimensional configuration comprising a back side having an annular depression;

each of the folded extensions comprising a portion of the annular depression; and the annular structure of the locking piece inserted into the annular depression.

4. The acoustic tile according to claim 1 further comprising:

the three-dimensional configuration comprising a back side having a central recess;

each of the folded extensions comprising a sidewall that forms a portion of an annular wall defining the central recess; and the locking piece positioned within the central recess, the locking piece butted up against each of the sidewalls of the folded extensions.

5. The acoustic tile according to claim 1 wherein the three-dimensional configuration comprises a back side that is substantially parallel with a first front surface of the plurality of outer surfaces; and wherein the first front surface of the plurality of outer surfaces has a non-rectangular polygon shape.

6. The acoustic tile according to claim 1 wherein each of the folded extensions collectively define a plurality of air gaps each having an enclosed internal volume within the three-dimensional configuration.

7. The acoustic tile according to claim 1 wherein each of the plurality of outer surfaces is a non-rectangular polygon.

8. The acoustic tile according to claim 1 wherein the plurality of outer surfaces comprises a first triangular surface, a second triangular surface, a third triangular surface, and a fourth triangular surface.

9. The acoustic tile according to claim 1 wherein the single piece of materials is a felt sheet.

10. The acoustic tile of claim 1 wherein the plurality of outer surfaces comprises:

an equilateral triangle;

an isosceles triangle extending from each edge of the equilateral triangle, each of the isosceles triangles comprising first and second distal edges;

a first parallelogram extending from each of the first distal edges of the isosceles triangles;

a second parallelogram extending from each of the second distal edges of the isosceles triangles.

11. An acoustic tile comprising:

a single piece of material folded along a plurality of folding scores to form a three-dimensional configuration, the three-dimensional configuration comprising a plurality of folded extensions and a back side, the back side comprising a central recess, each of the plurality of folded extensions comprising a surface defining a portion of the back side and a sidewall, the sidewalls of the plurality of folded extensions collectively forming an annular wall defining the central recess; and a locking piece positioned within the central recess and butted up against each of the sidewalls of the folded extensions to hold the single piece of material in the three-dimensional configuration.

12. An acoustic tile comprising:

a single piece of material folded along a plurality of folding scores to form a three-dimensional configuration, the three-dimensional configuration comprising:

a plurality of outer surfaces arranged in a non-coplanar and non-orthogonal orientation relative to one another to collectively form a multi-planar faceted geometry that is visible from a front of the three-dimensional configuration, the plurality of outer surfaces comprising:

an equilateral triangle;

an isosceles triangle extending from each edge of the equilateral triangle, each of the isosceles triangles comprising first and second distal edges;

a first parallelogram extending from each of the first distal edges of the isosceles triangles;

a second parallelogram extending from each of the second distal edges of the isosceles triangles;

a back side, each of the plurality of folded extensions forming a portion of the back side; and a locking piece holding the single piece of material in the three-dimensional configuration;

wherein an outer perimetric edge of the back side forms a closed polygonal shape.

13. The acoustic tile according to claim 12 wherein the closed polygonal shape is a hexagon.

14. The acoustic tile according to claim 12 wherein the plurality of outer surfaces are arranged to collectively form a faceted dome.

15. The acoustic tile according to claim 12 further comprising a locking mechanism configured to attach the acoustic tile to a building structure when the single piece of material is in the three-dimensional configuration.

16. The acoustic tile according to claim 12 wherein the single piece of material is alterable between a substantially flat configuration and the three-dimensional configuration.

17. The acoustic tile of claim 12 further comprising:

the locking piece comprising an annular structure;

the back side of three-dimensional configuration comprising an annular depression;

each of the folded extensions comprising a portion of the annular depression; and the annular structure of the locking piece inserted into the annular depression.

18. The acoustic tile of claim 12 wherein the locking piece comprises a plurality of magnets.

* * * * *